United States Patent
Kim et al.

(10) Patent No.: US 8,488,977 B2
(45) Date of Patent: Jul. 16, 2013

(54) TIME DIVISION MULTIPLE ACCESS OVER WAVELENGTH DIVISION MULTIPLEXED PASSIVE OPTICAL NETWORK

(75) Inventors: Byoung Whi Kim, Daejeon (KR); Han Hyub Lee, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 617 days.

(21) Appl. No.: 12/673,607

(22) PCT Filed: Aug. 14, 2008

(86) PCT No.: PCT/KR2008/004758
§ 371 (c)(1),
(2), (4) Date: Feb. 16, 2010

(87) PCT Pub. No.: WO2009/025474
PCT Pub. Date: Feb. 26, 2009

(65) Prior Publication Data
US 2011/0020001 A1    Jan. 27, 2011

(30) Foreign Application Priority Data

Aug. 17, 2007   (KR) .................. 10-2007-0082933
Aug. 6, 2008    (KR) .................. 10-2008-0076745

(51) Int. Cl.
*H04J 14/02* (2006.01)
(52) U.S. Cl.
USPC ............ 398/175; 398/97; 398/66; 398/70; 398/75; 398/160; 398/183
(58) Field of Classification Search
USPC ............ 398/97, 66, 70, 75, 175, 160, 183
See application file for complete search history.

(56) References Cited

U.S. PATENT DOCUMENTS

| 5,559,624 | A | 9/1996 | Darcie et al. |
| 6,532,091 | B1* | 3/2003 | Miyazaki et al. ............ 398/175 |
| 7,164,861 | B2* | 1/2007 | Takachio et al. ............ 398/70 |
| 2006/0153565 | A1 | 7/2006 | Park et al. |
| 2006/0239682 | A1 | 10/2006 | Park et al. |
| 2007/0147837 | A1 | 6/2007 | Yoo et al. |

FOREIGN PATENT DOCUMENTS

| KR | 1020040056828 A | 7/2004 |
| KR | 1020050055098 A | 6/2005 |
| KR | 1020050092684 A | 9/2005 |
| KR | 1020060042486 A | 5/2006 |
| WO | 2006/052075 A1 | 5/2006 |

OTHER PUBLICATIONS

International Search Report: PCT/KR2008/004758.
Jae-Myoung Hyun, et al; "Economic Evolution from EPON to WDM-overlaid PON Employing a Wavelength Conversion Node", Optical Fiber Communication and the National Fiber Optic Engineers Conference, Mar. 25-29, 2007, OFC/NFOEC 2007. Conference on Digital Object Identifier: 10.1109/OFC.2007.4348903; pp. 1-3.

* cited by examiner

*Primary Examiner* — Danny Leung
(74) *Attorney, Agent, or Firm* — Ladas & Parry LLP (57) ABSTRACT

Provided is a time division multiple access over wavelength division multiplexed passive optical network (TDM-over-WDM-PON) system. According to the TDM-over-WDM-PON system, a downstream optical signal is separated according to a wavelength in a remote node, transmitted to an optical amplifying device located in subscriber equipment, amplified in the optical amplifying device, transmitted back to the remote node, and then transmitted to the subscriber equipment. Also, an upstream optical signal is transmitted to a wavelength converting device located in the subscriber equipment from the remote node, wavelength-converted in the wavelength converting device, returned back to the remote node, and then transmitted to a central office.

6 Claims, 7 Drawing Sheets

TIME DIVISION MULTIPLE ACCESS OVER WAVELENGTH DIVISION MULTIPLEXED PASSIVE OPTICAL NETWORK

TECHNICAL FIELD

The present invention relates to a method of applying a wavelength division multiplexing technology to a time division multiplexing (TDM) passive optical network (PON).

The present invention is derived from research performed as an IT growth power technology development business of the Ministry of Information and Communication and the Institute of Information Technology Assessment (IITA), Republic of Korea [2007-S-014-01, Metro-Access Integrated Optical Network Technology].

BACKGROUND ART

In a gigabit Ethernet (GE)-passive optical network (PON), which is a type of a conventional time division multiplexing (TDM)-passive optical network (PON), a feeder fiber accepts the maximum 32 subscribers and provides a total bandwidth of 1 Gbps. A gigabit (G)-PON, which is another type of the conventional TDM-PON, is being developed, and accepts 64 subscribers and provides a total bandwidth of 2.6 Gbps downward and 1.2 Gbps upward. A transmission distance of the conventional TDM-PON is prescribed to 20 Km. It is expected that services requiring a high bandwidth, including an IPTV, will be in the mainstream within a few years, and accordingly, a fiber to the home (FTTH) optical network is being developed, and a GE-PON is currently provided. However, as the number of subscribers of the FTTH optical network increases, it is required to efficiently use an infrastructure of a conventional optical network. Also, the conventional optical network needs to be improved so as to provide an increased bandwidth to a subscriber.

A dense wavelength division multiplexing (WDM)-PON is widely known as a next generation optical network. The dense WDM-PON is being actively studied specifically in Korea, and a system having 1 Gbps per wavelength and 16 optical wavelength multiplexing structure is about to be commercialized. However, an optical transmission/reception module of the dense WDM-PON is much more expensive than that of the GE-PON, and thus it is not suitable to apply the dense WDM-PON to the FTTH optical network with a current price level. Also, in order to apply the dense WDM-PON, a remote node, and an optical terminal of a subscriber need to be exchanged. Accordingly, the WDM-PON is only applied to a few new subscribers who require a high bandwidth.

DISCLOSURE OF INVENTION

Technical Problem

The present invention provides a method and system which can remarkably reduce a feeder fiber line and enlarge a transmission distance between a central office (CO) and a terminal of a subscriber, by applying a wavelength division multiplexing (WDM) transmission method to a time division multiplexing-passive optical network (TDM-PON), between the CO and a remote node (RN).

Technical Solution

According to an aspect of the present invention, there is provided a remote node of a passive optical network located between a central office and subscriber equipment, the remote node comprising: a wavelength multiplexer which demultiplexes downstream optical signals received from the central office and multiplexes wavelength-converted upstream optical signals; and an optical circulator which transmits the demultiplexed downstream optical signals to an optical signal amplifying device and then transmits to the subscriber equipment an amplified downstream optical signals received from the optical signal amplifying device, and transmits the upstream optical signals to a wavelength converting device and then transmits to the wavelength multiplexer the wavelength-converted upstream received from the optical amplifying device.

According to another aspect of the present invention, there is provided subscriber equipment in a passive optical network connected to a central office via a remote node, the subscriber equipment comprising: an optical amplification unit which receives a downstream optical signal from the remote node, amplifies the downstream optical signal, and then returns the downstream optical signal to the remote node; and a wavelength conversion unit which receives an upstream optical signal from the remote node, converts the upstream optical signal to a predetermined wavelength, and then returns the upstream optical signal to the remote node.

According to another aspect of the present invention, there is provided subscriber equipment in a passive optical network connected to a central office via a remote node, the subscriber equipment comprising: a signal regeneration unit which receives a downstream optical signal from the remote node, restores the downstream optical signal to the original signal via timing re-arrangement and form restoration processes, and then returns the restored downstream optical signal to the remote node; and a wavelength conversion unit which receives an upstream optical signal from the remote node, converts the upstream optical signal to a predetermined wavelength, and then returns the converted upstream optical signal to the remote node.

According to another aspect of the present invention, there is provided subscriber equipment in a passive optical network connected to a central office via a remote node, the subscriber equipment comprising: a first reflective semiconductor optical amplifier (RSOA) which amplifies a downstream optical signal received from the remote node; a coupler which splits the amplified downstream optical signal and transmits a part of the split downstream optical signal to the remote node; a signal conversion unit which converts an upstream optical signal received from the remote node to an electric signal; a second RSOA which amplifies another part of the split downstream optical stream, and modulates and outputs the amplified downstream optical stream by using the electric signal; and a WDM filter which transmits the downstream optical signal from the second RSOA to the remote node.

According to another aspect of the present invention, there is provided a central office in a passive optical network connected to subscriber equipment via a remote node, the central office comprising: a seed light source; a wavelength multiplexer which wavelength-divides a seed light; and a plurality of optical transmitters which modulate the wavelength-divided seed light to downstream optical signals containing downstream data, wherein wavelength multiplexer wavelength-multiplexes and outputs the downstream optical signals having different wavelengths modulated by the plurality of optical transmitters.

According to another aspect of the present invention, there is provided a method of transmitting an optical signal in a remote node of a passive optical network comprising a central office, the remote node, and subscriber equipment, the method comprising: a downstream transmission step wherein downstream optical signals are demultiplexed and are transmitted to an external optical amplifying device, and the downstream optical signals amplified by the optical amplifying device are received and then transmitted to the subscriber equipment; and an upstream transmission step wherein upstream optical signals are transmitted to an external wavelength converting device, and the wavelength-converted upstream optical signals are received from the wavelength converting device and then transmitted to the central office.

ADVANTAGEOUS EFFECTS

According to the present invention, by installing an additional apparatus to a subscriber while continuously using subscriber equipment and an optical splitter of a TDM-PON and by applying a WDM transmission method between a CO and a RN, a feeder fiber line can be remarkably reduced and a transmission distance between the CO and the subscriber equipment can be increased. Accordingly, high price, which is the main issue of a conventional WDM-PON, can be decreased, and a disadvantage of exchanging equipment so as to change TDM-PON to WDM-PON can be solved.

DESCRIPTION OF DRAWINGS

The above and other features and advantages of the present invention will become more apparent by describing in detail exemplary embodiments thereof with reference to the attached drawings in which.

BEST MODE

According to an aspect of the present invention, there is provided a remote node of a passive optical network located between a central office and subscriber equipment, the remote node comprising: a wavelength multiplexer which demultiplexes downstream optical signals received from the central office and multiplexes wavelength-converted upstream optical signals; and an optical circulator which transmits the demultiplexed downstream optical signals to an optical signal amplifying device and then transmits to the subscriber equipment an amplified downstream optical signals received from the optical signal amplifying device, and transmits the upstream optical signals to a wavelength converting device and then transmits to the wavelength multiplexer the wavelength-converted upstream received from the optical amplifying device.

According to another aspect of the present invention, there is provided subscriber equipment in a passive optical network connected to a central office via a remote node, the subscriber equipment comprising: an optical amplification unit which receives a downstream optical signal from the remote node, amplifies the downstream optical signal, and then returns the downstream optical signal to the remote node; and a wavelength conversion unit which receives an upstream optical signal from the remote node, converts the upstream optical signal to a predetermined wavelength, and then returns the upstream optical signal to the remote node.

According to another aspect of the present invention, there is provided subscriber equipment in a passive optical network connected to a central office via a remote node, the subscriber equipment comprising: a signal regeneration unit which receives a downstream optical signal from the remote node, restores the downstream optical signal to the original signal via timing re-arrangement and form restoration processes, and then returns the restored downstream optical signal to the remote node; and a wavelength conversion unit which receives an upstream optical signal from the remote node, converts the upstream optical signal to a predetermined wavelength, and then returns the converted upstream optical signal to the remote node.

According to another aspect of the present invention, there is provided subscriber equipment in a passive optical network connected to a central office via a remote node, the subscriber equipment comprising: a first reflective semiconductor optical amplifier (RSOA) which amplifies a downstream optical signal received from the remote node; a coupler which splits the amplified downstream optical signal and transmits a part of the split downstream optical signal to the remote node; a signal conversion unit which converts an upstream optical signal received from the remote node to an electric signal; a second RSOA which amplifies another part of the split downstream optical stream, and modulates and outputs the amplified downstream optical stream by using the electric signal; and a WDM filter which transmits the downstream optical signal from the second RSOA to the remote node.

According to another aspect of the present invention, there is provided a central office in a passive optical network connected to subscriber equipment via a remote node, the central office comprising: a seed light source; a wavelength multiplexer which wavelength-divides a seed light; and a plurality of optical transmitters which modulate the wavelength-divided seed light to downstream optical signals containing downstream data, wherein wavelength multiplexer wavelength-multiplexes and outputs the downstream optical signals having different wavelengths modulated by the plurality of optical transmitters.

According to another aspect of the present invention, there is provided a method of transmitting an optical signal in a remote node of a passive optical network comprising a central office, the remote node, and subscriber equipment, the method comprising: a downstream transmission step wherein downstream optical signals are demultiplexed and are transmitted to an external optical amplifying device, and the downstream optical signals amplified by the optical amplifying device are received and then transmitted to the subscriber equipment; and an upstream transmission step wherein upstream optical signals are transmitted to an external wavelength converting device, and the wavelength-converted upstream optical signals are received from the wavelength converting device and then transmitted to the central office.

Mode for Invention

Hereinafter, the present invention will be described more fully with reference to the accompanying drawings, in which exemplary embodiments of the invention are shown.

Figure 1:
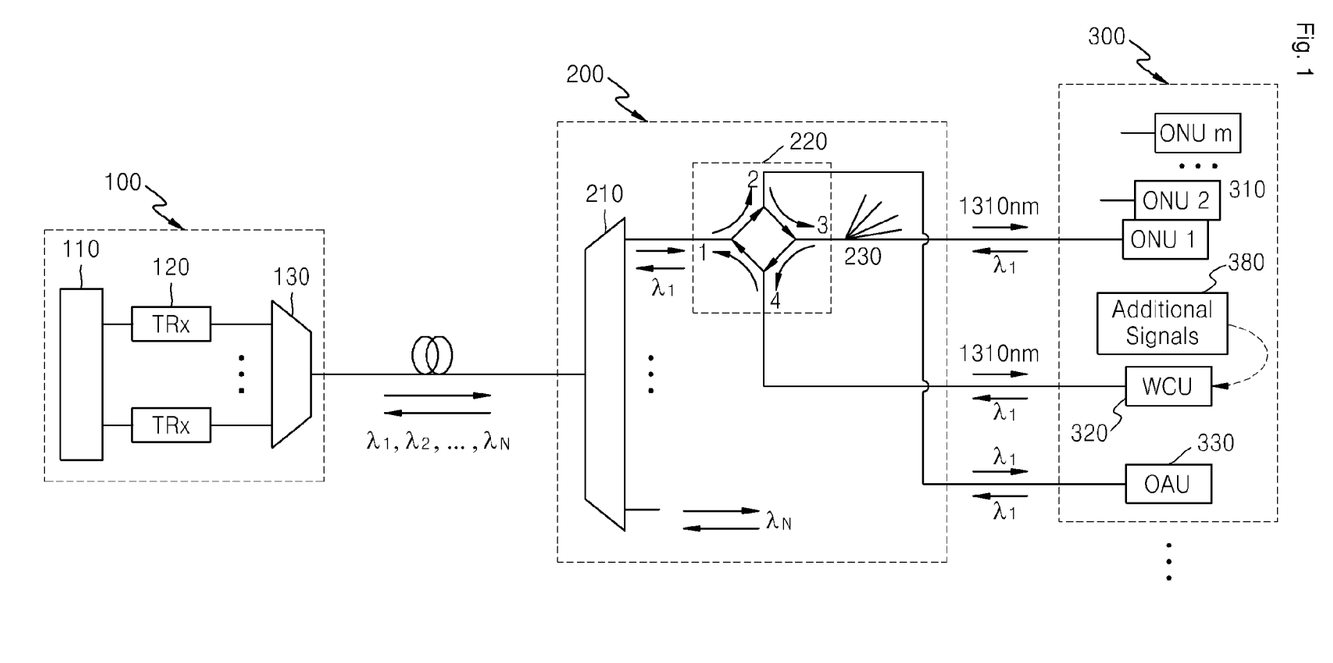
FIG. 1 is a diagram illustrating a time division multiple access over wavelength division multiplexed passive optical network (TDM-over-WDM-PON), according to an embodiment of the present invention.

FIG. 1 is a diagram illustrating a time division multiple access over wavelength division multiplexed passive optical network (TDM-over-WDM-PON), according to an embodiment of the present invention;

Referring to FIG. 1, the TDM-over-WDM-PON includes a central office (CO), a remote node (RN) 200, and a subscriber equipment 300.

An optical line terminal (OLT) 100 installed in the CO includes a protocol processor 110, a plurality of transmitters and receivers (TRx) 120, and a wavelength multiplexer 130. The protocol processor 110 switches downstream data going down to the subscriber and upstream data coming up from the subscriber, and processes a transmission protocol. The plurality of TRx 120 transmits and receives an optical signal, and the wavelength multiplexer 130 wavelength-multiplexes and transmits different optical wavelengths of downstream optical signals received from the plurality of TRx 120 to one feeder fiber, and simultaneously wavelength-demultiplexes the wavelength-multiplexed upstream optical signals.

The RN 200 includes a wavelength multiplexer 210, an optical circulator 220, and an optical splitter 230. The wavelength multiplexer 210 receives the wavelength-multiplexed downstream optical signals from the feeder fiber, demultiplexes the received downstream optical signals, and transmits the demultiplexed downstream optical signals to N optical fibers connected to the subscribers. Also, the wavelength multiplexer 210 receives N upstream optical signals according to each wavelength from the N optical fibers, wavelength-multiplexes the N upstream optical signals, and then transmits the N upstream optical signals to one feeder fiber. The optical circulator 220 transmits the received optical signal to an assigned output port, and the optical splitter 230 splits the received optical signal into M optical signals.

The subscriber equipment 300 includes a plurality of conventional TDM-PON optical network units (ONUs) 310 or optical network terminals ONTs, a wavelength conversion unit (WCU) 320 which converts and outputs an optical signal received from the conventional TDM-PON ONUs 310 to a predetermined dense WDM (DWDM) optical wavelength, an optical amplification unit (OAU) 330 which amplifies a strength of a received optical signal, and an additional signal unit 380 which transmits additional data which are not data from conventional TDM-PON subscribers to the CO.

Detailed operations of the TDM-over-WDM-PON according to the current embodiment of the present invention will now be described.

An optical signal transmitted from the wavelength multiplexer 210 of the RN 200 to the subscriber equipment 300 is input to the optical circulator 220, circulated in the optical circulator 220, and then output to the OAU 330 of the subscriber equipment 300. The optical signal input to the OAU 330 of the subscriber equipment 300 is amplified, and re-input to the optical circulator 220 of the RN 200. The optical signal input to the optical circulator 220 is circulated inside the optical circulator 220, and then output through the optical splitter 230. Upon receiving the optical signal, the optical splitter 230 of the RN 200 transmits the optical signal to the M ONUs 310.

Meanwhile, the optical signals output from the M ONUs 310 gather in the optical splitter 230, and are transmitted to the optical circulator 220 of the RN 200. The optical signals input to the optical circulator 220 are circulated in the optical circulator 220, and then transmitted to the WCU 320 of the subscriber equipment 330. The optical signals input to the WCU 320 are converted to a predetermined wavelength, and then re-input to the optical circulator 220. The optical signals re-input to the optical circulator 220 are circulated in the optical circulator 220, and then transmitted to a predetermined port of the wavelength multiplexer 210. The optical signals input to the wavelength multiplexer 210 are wavelength-multiplexed with other optical signals having different wavelength received from another port, transmitted to one feeder fiber, and then transmitted to the CO.

The WCU 320 of the subscriber equipment 300 may convert a received optical signal to an electric signal, re-convert the electric signal to an optical signal having a predetermined wavelength, and then output the optical signal. Alternatively, the WCU 320 may output the optical signal after converting the wavelength, without converting the optical signal into the electric signal.

Figure 2:
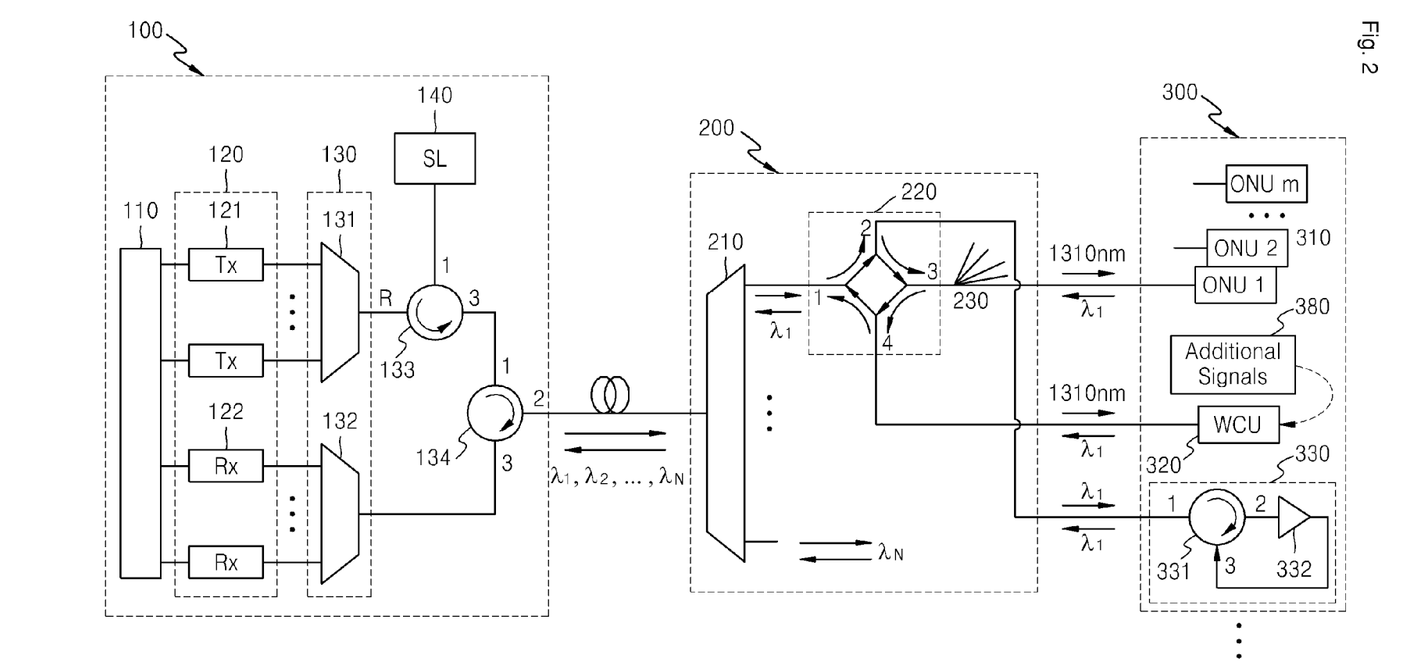
FIG. 2 is a diagram illustrating a central office (CO) and subscriber equipment in a TDM-over-WDM-PON, according to other embodiments of the present invention.

FIG. 2 is a diagram illustrating a CO and subscriber equipment 300 in a TDM-over-WDM-PON, according to other embodiments of the present invention.

Referring to FIG. 2, an OLT 100 installed in the CO includes a protocol processor 110, an plurality of optical transmitters 121, a plurality of optical receivers 122, a first wavelength multiplexer 131, a second wavelength multiplexer 132, a first circulator 133, a second circulator 134, and a seed light source (SL source) 134.

A seed light output from the SL source 134 is input to the first wavelength multiplexer 131 via the first circulator 133. The first wavelength multiplexer 131 wavelength-divides the received seed light to have a plurality of optical wavelengths, and transits the divided optical wavelengths to the plurality of optical transmitters 121. The optical transmitters 121 amplify the received seed light, modulate the seed light into downstream data received from the protocol processor 110, and output an optical signal including the downstream data. The optical signals having different wavelengths output from the optical transmitters 121 are re-transmitted to the first wavelength multiplexer 131. The first wavelength multiplexer 131 wavelength-multiplexes the received optical signals, and then transmits the optical signals to the first circulator 133 via one optical fiber. The first circulator 133 transmits the wavelength-multiplexed optical signals to the second circulator 134. The second circulator 134 circulates the received optical signals, and transmits the optical signals to the RN 200 via a feeder fiber.

Also, wavelength-multiplexed upstream optical signals that come up from the RN 200 are transmitted to the second circulator 134, circulated, and then transmitted to the second wavelength multiplexer 132. The second wavelength multiplexer 132 demultiplexes the received upstream optical signals and transmits the demultiplexed upstream optical signals to the optical receivers 122. The optical receivers 122 convert the received upstream optical signals to electric signals.

Generally, one optical transmitter 121 and one optical receiver 122 form a pair according to a wavelength, so as to form one TRx 120. A reflective semiconductor optical amplifier (RSOA) or an SOA may combine with a circulator to from the optical transmitter 121.

The SL source 134 may be a broadband light source (BLS) or a light source wherein a plurality of optical wavelengths are multiplexed. When the SL source 134 is a BLS, the wavelength of the seed light is divided (spectrum sliced) via the first wavelength multiplexer 131, and each of the sliced seed light is input to the optical transmitter 121. When the SL source 134 is the light source wherein a plurality of optical wavelengths are multiplexed, the wavelength of the seed light is divided (WDM demultiplexed) via the first wavelength multiplexer 131, and each of the divided seed light is input to the optical transmitter 121.

The OAU 330 of the subscriber 300 may include a circulator 331 and an amplifier 332. An optical signal transmitted from the optical circulator 220 of the RN 200 is input to the circulator 331 of the OAU 330, and then output to the amplifier 332. The optical signal outputted from the amplifier 332 is input to the circulator 331, circulated in the circulator 331, and then output to the optical circulator 220 of the RN 200.

Figure 3:
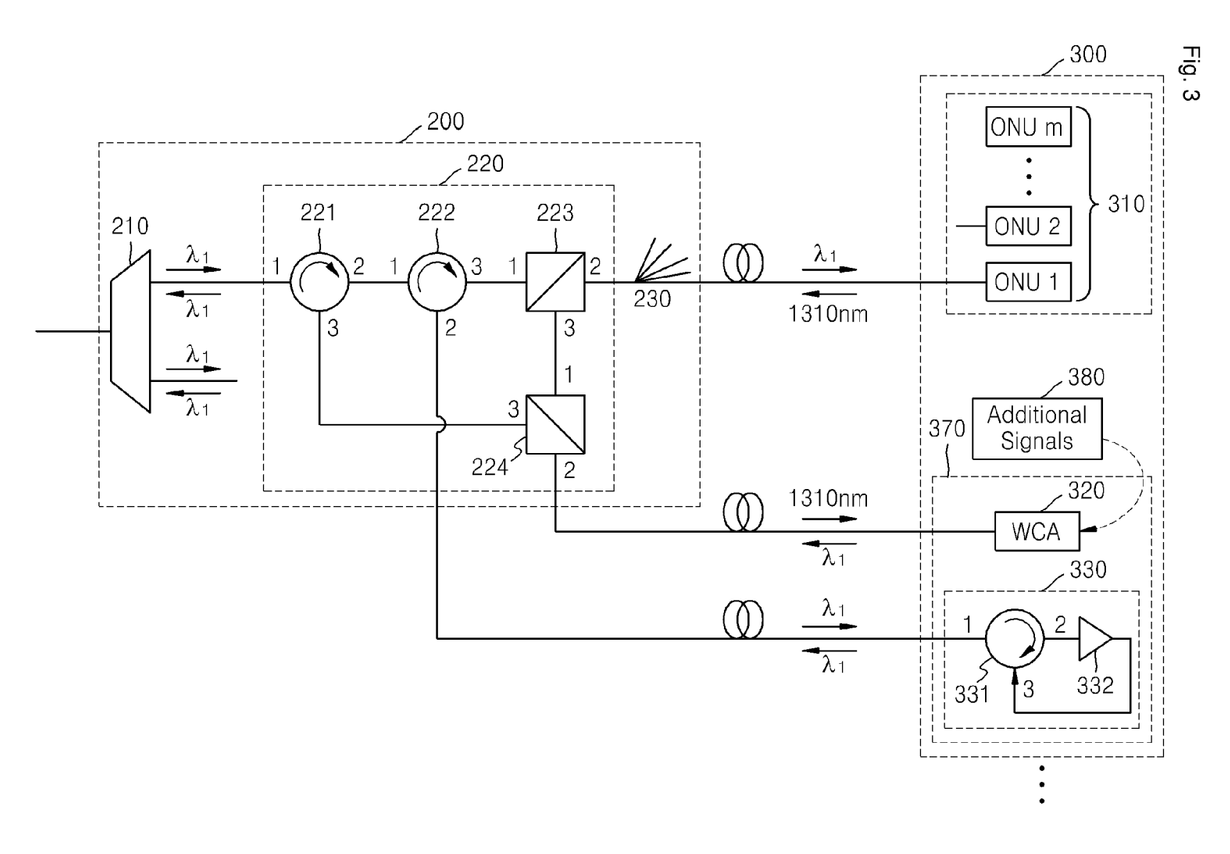
FIG. 3 is a diagram illustrating a remote node in a TDM-over-WDM-PON, according to an embodiment of the present invention.

FIG. 3 is a diagram illustrating a RN 200 in a TDM-over-WDM-PON, according to an embodiment of the present invention.

Referring to FIG. 3, the RN 200 includes a wavelength multiplexer 210, a first circulator 221, a second circulator 222, a first WDM filter 223, a second WDM filter 224, and an optical splitter 230.

A downstream optical signal that is wavelength-demultiplexed and outputted from the wavelength multiplexer 210 is input to a first port of the first circulator 221 and output from a second port of the first circulator 221. The downstream optical signal output from the second port of the first circulator 221 is input to a first port of the second circulator 222 and output from a second port of the second circulator 222. The downstream optical signal output from the second port of the second circulator 222 is transmitted to an OAU 330 of subscriber equipment 300. Then, the downstream optical signal is input to a first port of a circulator 331 of the OAU 330, output to a second port of the circulator 331, amplified by an amplifier 332, input to a third port of the circulator 331, and then output to the first port of the circulator 331. The downstream optical signal output to the first port of the circulator 331 is input to the second port of the second circulator 222, and then output to a third port of the second circulator 222. Next, the downstream optical signal is input to a first port of the first WDM filter 223, which classifies a DWDM wavelength band and an upstream optical wavelength (1310 nm band) used by a TDM-PON, and then output to a second port of the first WDM filter 223.

Also, an upstream optical signal in a 1310 nm band input to a second port of the first WDM filter 223 via the optical splitter 230 is output to a third port of the first WDM filter 223. The upstream optical signal is input to a first port of the second WDM filter 224, and output to a second port of the second filter 224. Then, the upstream optical signal is converted to an optical signal having a predetermined DWDM wavelength by the WCU 320 of the subscriber equipment 300, re-input to the second port of the second WDM filter 224, and output to a third port of the second WDM filter 224. The optical signal output to the third port of the second WDM filter 224 is input to a third port of the first circulator 221, and output to the first port of the first circulator 221. The optical signal output to the first port of the first circulator 221 is input to a corresponding port of the wavelength multiplexer 210. Then, the wavelength multiplexer 210 wavelength-multiplexes the received optical signal with other optical signals having different wavelengths, and transmits the optical signal to an OLT 100 via a feeder fiber.

Figure 4:
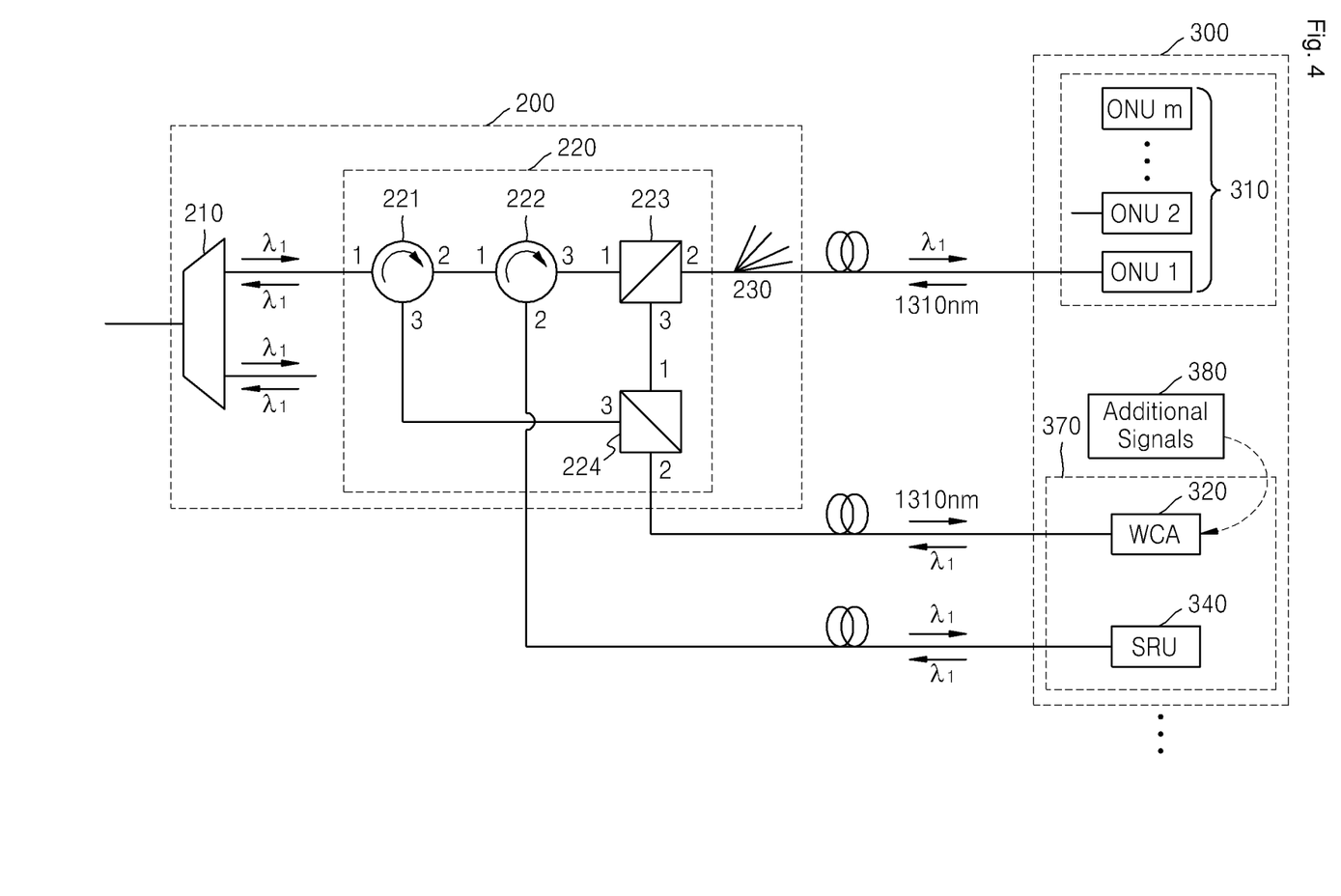
FIG. 4 is a diagram illustrating subscriber equipment in a TDM-over-WDM-PON, according to another embodiment of the present invention.

FIG. 4 is a diagram illustrating subscriber equipment 300 in a TDM-over-WDM-PON, according to another embodiment of the present invention.

Referring to FIG. 4, the structure of the TDM-over-WDM-PON according to the current embodiment is similar to that according to the previous embodiment in FIG. 3. However in the current embodiment, a signal regeneration unit (SRU) 340 is included in the subscriber equipment 300, instead of the OAU 330. An optical signal output from a second port of a second circulator 222 is input to the SRU 340. The optical signal input to the SRU 340 is restored to the original signal via not only an optical amplification process, but also via timing re-arrangement and form restoration processes. The SRU 340 may convert the optical signal to an electric signal, perform the timing re-arrangement process, and then convert the electric signal back to the optical signal. Alternatively, the SRU 340 may perform signal arrangement and form restoration processes without converting the optical signal to an electric signal.

Figure 5:
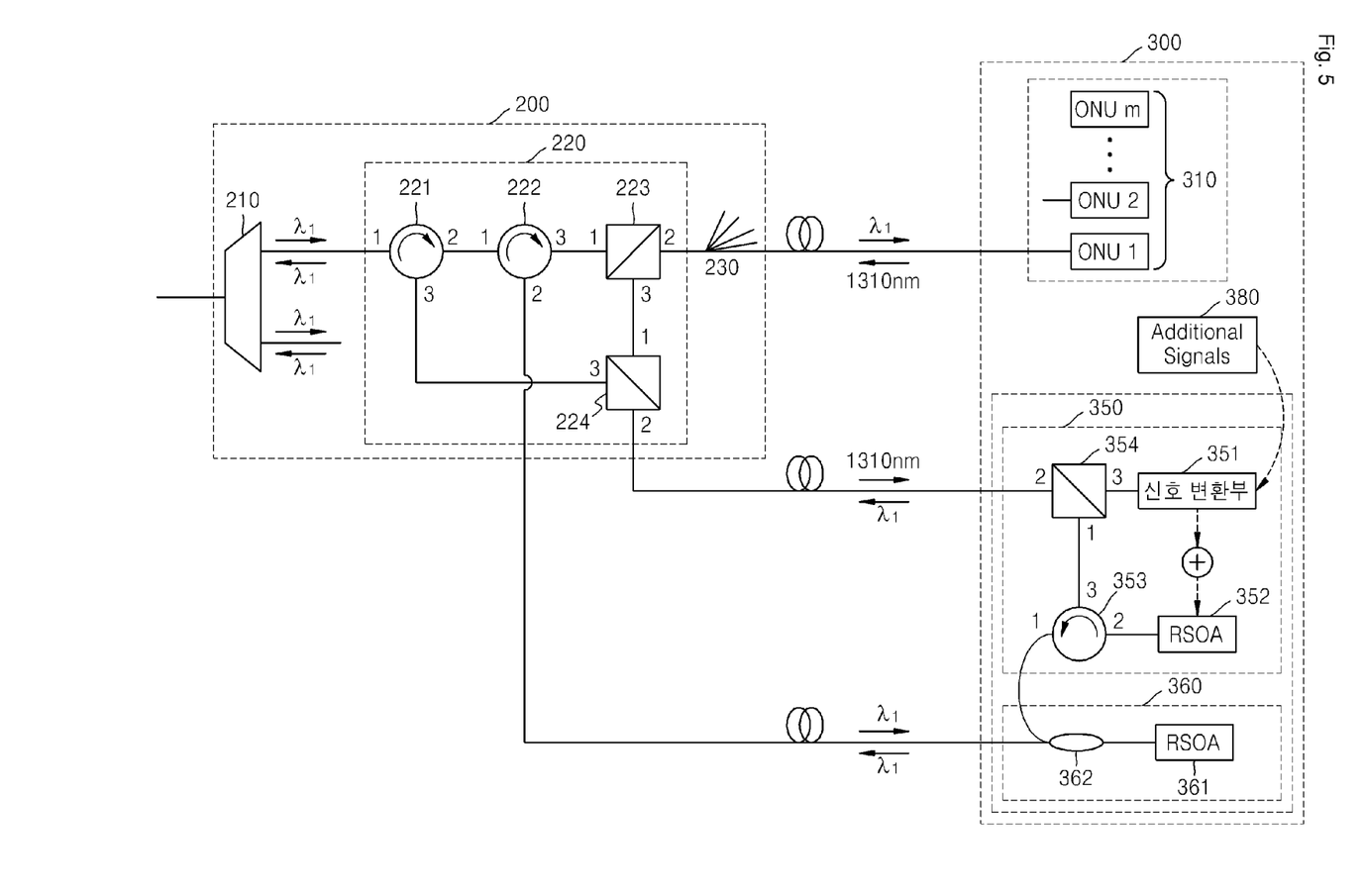
FIG. 5 is a diagram illustrating subscriber equipment in a TDM-over-WDM-PON, according to another embodiment of the present invention.

FIG. 5 is a diagram illustrating subscriber equipment 300 in a TDM-over-WDM-PON, according to another embodiment of the present invention.

Referring to FIG. 5, the structure of the TDM-over-WDM-PON according to the current embodiment is similar to that according to the previous embodiment in FIG. 3. However in the current embodiment, an apparatus 350 including an RSOA is used instead of the WCU 320, and an apparatus 360 including an RSOA is used instead of the OAU 330.

Downstream optical signals in a DWDM wavelength band output from a second port of a second circulator 222 are input to a first RSOA 361 via a coupler 362. Then, the downstream optical signals are amplified in the first RSOA 361, and then re-input to the coupler 362. A part of the downstream optical signals is input to the second port of the second circulator 222, and a remaining part of the downstream optical signals is input to a first port of a third circulator 353. The downstream optical signals input to the first port of the third circulator 353 is output a second port of the third circulator 353, and then input to a second RSOA 352. The downstream optical signal input to the second RSOA 352 operates as a seed light. In other words, the downstream optical signal is planarized and amplified in the second RSOA 352, and then modulated and output by an electric signal output from a signal conversion unit 351 and an additional signal unit 380. The downstream optical signal output from the second RSOA 352 is input to the second port of the third circulator 353 and output to a third port of the third circulator 353. Then, the downstream optical signal is input to a first port of a third WDM filter 354 and output to a third port of the third WDM filter 354.

Also, an upstream optical signal in a 1310 nm band output to a second port of a second WDM filter 224 is input to a second port of the third WDM filter 354 and output to a third port of the third WDM filter 354. Then, the upstream optical signal is transmitted to the signal conversion unit 351 and then converted to an electric signal by the signal conversion unit 351.

Such apparatuses 350 and 360 may be identically used irrelevant to a DWDM optical wavelength.

Figure 6:
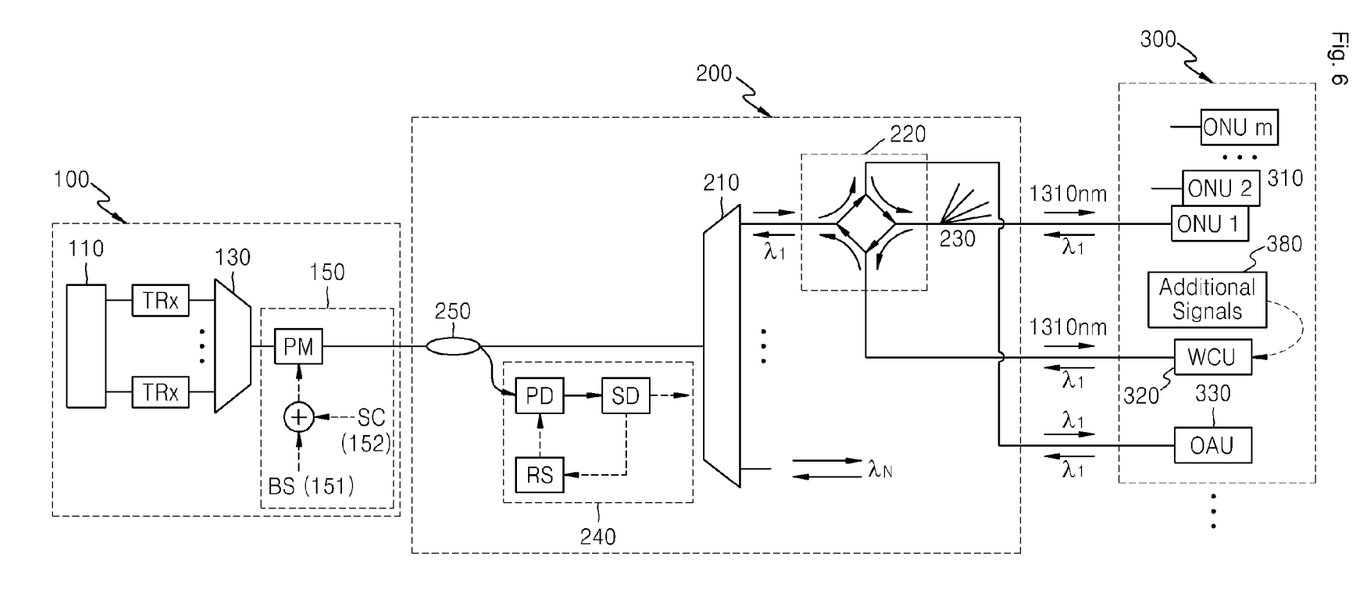
FIG. 6 is a diagram for describing a method of simultaneously performing data transmission and broadcasting transmission services in a TDM-over-WDM-PON, according to an embodiment of the present invention.

FIG. 6 is a diagram for describing a method of simultaneously performing data transmission and broadcasting transmission services in a TDM-over-WDM-PON, according to an embodiment of the present invention.

Referring to FIG. 6, a broadcast signal transmitter 150, which can add a broadcast signal, is included in an output port of a wavelength multiplexer 130 in a CO, the output port facing a subscriber direction. Also, a broadcast signal receiver 240, which can extract a broadcast signal that is additionally transmitted, is included in an RN 200.

The broadcast signal transmitter 150 performs phase modulation on a broadcast signal (BS) 151 included in a RF sub-carrier (SC) 152, and outputs the BS 151. The broadcast signal receiver 240 receives a part of an optical signal by splitting the optical signal by using a coupler 250, receives a signal by receiving a reference signal (RS) 243, performs phase modulation (PD) on the received signal, and converts the received signal to an electric signal. The phase of the RS 243 is adjusted so that the size of the received signal becomes the maximum.

Figure 7:
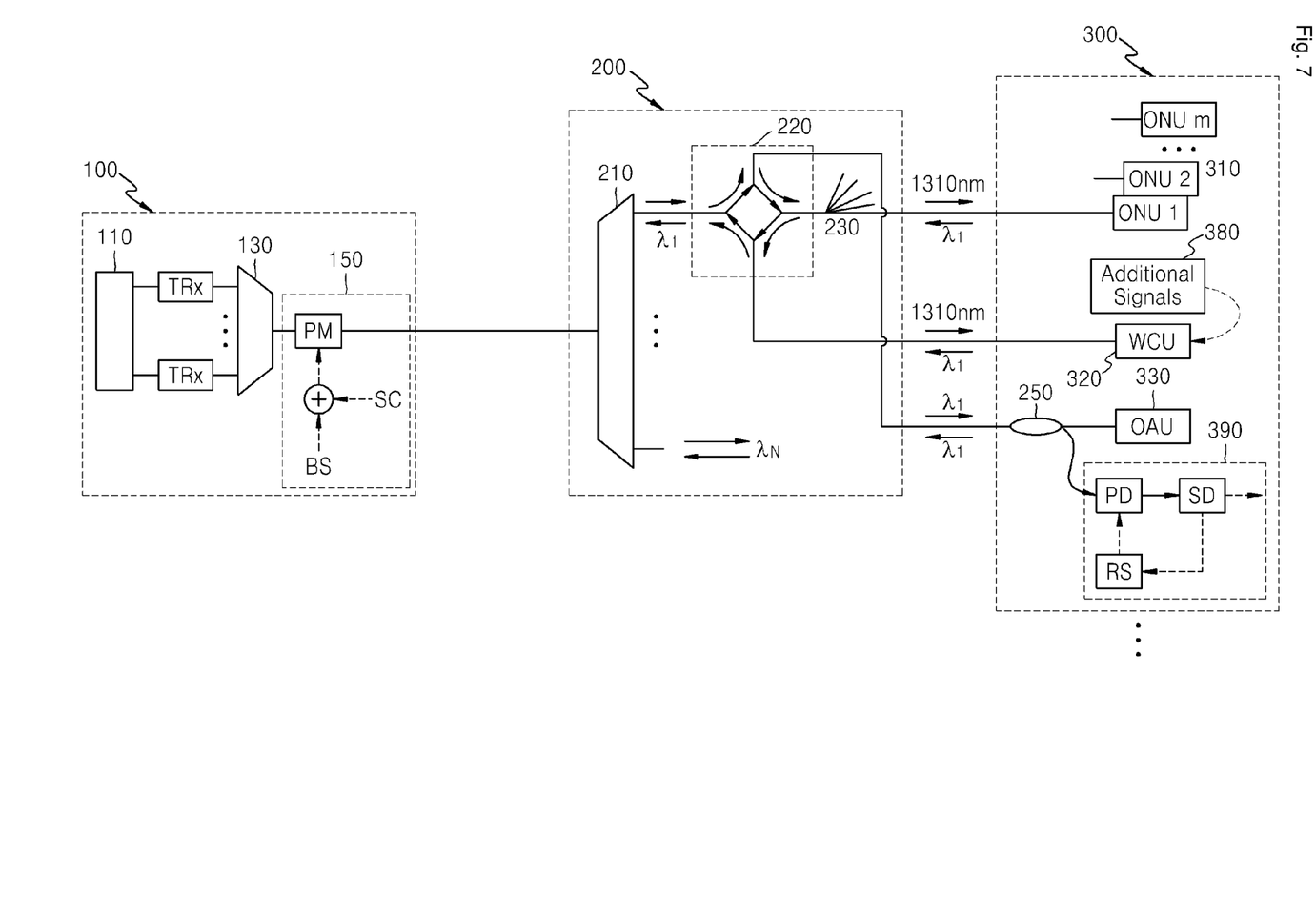
FIG. 7 is a diagram for describing a method of simultaneously performing data transmission and broadcasting transmission services in a TDM-over-WDM-PON, according to another embodiment of the present invention.

FIG. 7 is a diagram for describing a method of simultaneously performing data transmission and broadcasting transmission services in a TDM-over-WDM-PON, according to another embodiment of the present invention.

The method of FIG. 7 is almost similar to the method of FIG. 6, except that a broadcast signal receiver 390 is installed in subscriber equipment 300.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A remote node of a passive optical network located between a central office and subscriber equipment, the remote node comprising:
   a wavelength multiplexer which demultiplexes downstream optical signals received from the central office and multiplexes wavelength-converted upstream optical signals; and
   an optical circulator which transmits the demultiplexed downstream optical signals to an optical signal amplifying device and then transmits to the subscriber equipment an amplified downstream optical signals received from the optical signal amplifying device, and transmits the upstream optical signals to a wavelength converting device and then transmits to the wavelength multiplexer the wavelength-converted upstream received from wavelength converting device, and
   wherein the wavelength converting device is part of the subscriber equipment.

2. The remote node of claim 1, wherein the wavelength multiplexer transmits and receives an optical signal to and from the central office via one optical fiber by using a wavelength division multiplexing method.

3. The remote node of claim 1, further comprising an optical splitter which splits the downstream optical signal outputted from the optical circulator into a plurality of optical signals.

4. The remote node of claim 1, wherein the optical circulator comprises:
   a first circulator which is connected to an output port of the wavelength multiplexer and receives the demultiplexed downstream optical signals;
   a second circulator which transmits the demultiplexed downstream optical signals to the optical signal amplifying device and receives the amplified downstream optical signals from the optical signal amplifying device;
   a first wavelength division multiplexing (WDM) filter which transmits the amplified downstream optical signal to the subscriber equipment; and
   a second WDM filter which receives the upstream optical signals from the first WDM filter connected to the subscriber equipment and transmits the received upstream optical signals to the wavelength converting device, and receives the wavelength-converted upstream optical signals from the wavelength converting device and transmits the wavelength-converted upstream optical signals to the first circulator,
   wherein the first circulator transmits the wavelength-converted upstream optical signals received from the second WDM filter to the wavelength multiplexer.

5. The remote node of claim 1, further comprising:
   a coupler which splits an optical signal including a broadcast signal from the central office; and
   a broadcast signal receiver which extracts the broadcast signal included in the optical signal from a part of the optical signal split by the coupler.

6. A remote node of a passive optical network located between a central office and subscriber equipment, the remote node comprising:
   a wavelength multiplexer which demultiplexes downstream optical signals received from the central office and multiplexes wavelength-converted upstream optical signals;
   an optical circulator which transmits the demultiplexed downstream optical signals to an optical signal amplifying device and then transmits to the subscriber equipment an amplified downstream optical signals received from the optical signal amplifying device, and transmits the upstream optical signals to a wavelength converting device and then transmits to the wavelength multiplexer the wavelength-converted upstream received from the optical amplifying device;
   a coupler which splits an optical signal including a broadcast signal from the central office; and
   a broadcast signal receiver which extracts the broadcast signal included in the optical signal from a part of the optical signal split by the coupler.

* * * * *